Patented Oct. 27, 1953

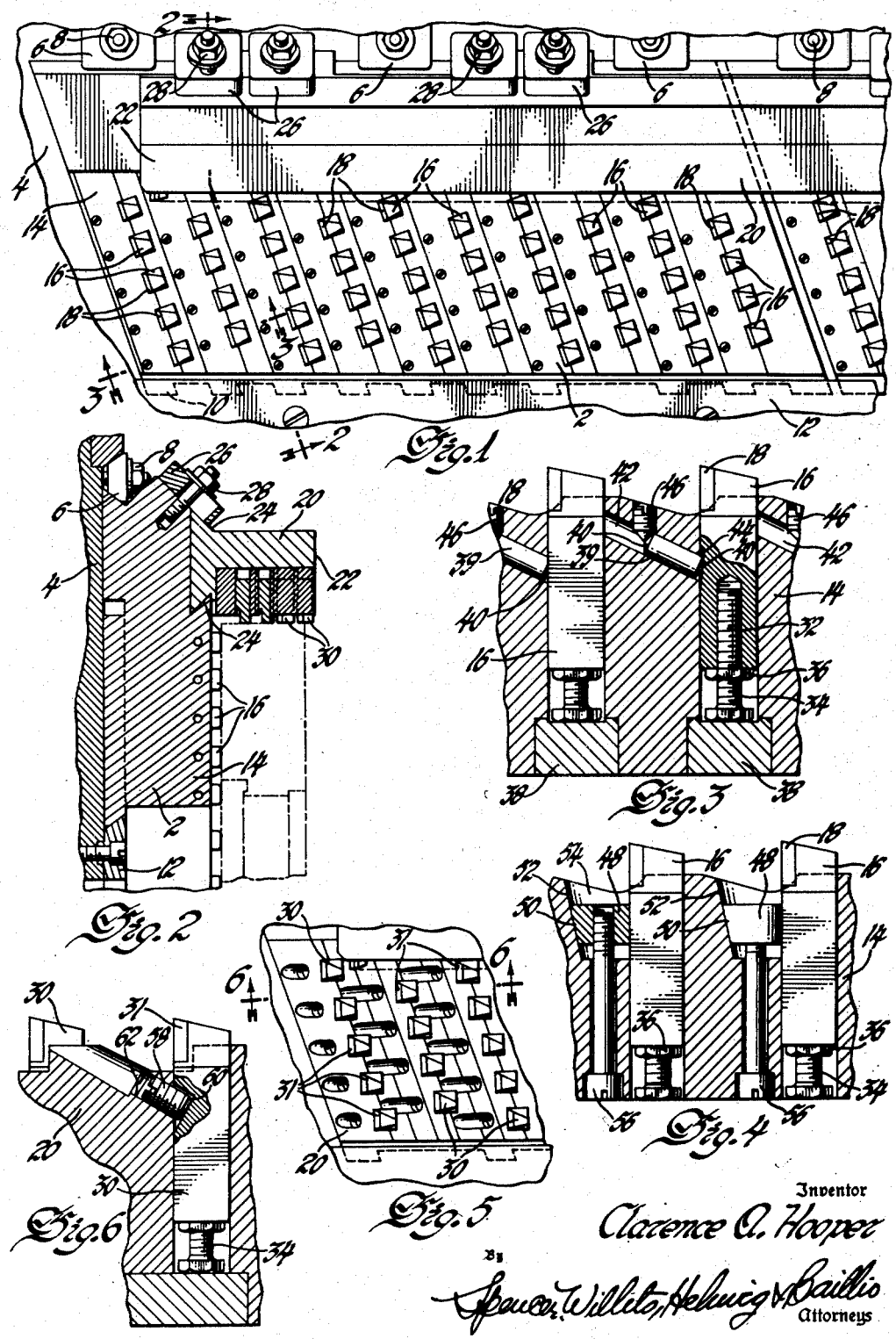
Oct. 27, 1953  C. A. HOOPER  2,656,590
BROACH
Filed May 15, 1948
Inventor
Clarence A. Hooper

2,656,590

UNITED STATES PATENT OFFICE 2,656,590

BROACH

Clarence A. Hooper, Flint, Mich., assignor to General Motors Corporation, Detroit, Mich., a corporation of Delaware Application May 15, 1948, Serial No. 27,182

1 Claim. (Cl. 29—95.1)

The present invention relates to tools and more particularly to a broaching tool for forming plane or generally curved surfaces on metal shapes.

In the manufacturing of such cooperating automotive engine parts as the cylinder block and cylinder head, it is desirable that the cooperating surfaces of such parts be formed evenly throughout the entire surface area, approaching as nearly as possible a plane surface. Such surfaces are usually obtained by clamping the part on the table of a heavy broaching machine which forms the surface desired either by reciprocating a broaching tool across the surface of the part or by reciprocating the part and bed across the broaching tool.

A broaching tool heretofore commonly employed in obtaining such surfaces has been provided with a plurality of elongated high carbon steel cutting tools having their cutting edges arranged in parallel relation across the supporting bed of the broaching tool. Such a tool has not been entirely satisfactory for machining surfaces of engine parts made of cast iron as the cutting edges of the broach occasionally encounter hard spots in the surface formed by the segregation of impurities in the cast iron and the cutting edges are injured by deep burns as each cutting tool of the broach passes across the area. With each cutting tool injured in substantially the same position the machine has to be shut down and each of the tools removed and replaced or the complete broach section removed and resharpened before the machine may resume operation. Such shutdowns are costly in labor, particularly in assembly line production where continuous operation of the line is dependent on continuous operation of the various stations in the line.

It is therefore an object of the present invention to provide a new and improved broaching tool which has outstanding wearing characteristics and which is adapted to greater efficiency in machine tool operation.

It is another object of the present invention to provide a new and improved broaching tool in which a plurality of individual cutting tools are adjustably and removably recessed in the broach along axes vertical to the plane of the support so that they may be individually removed and replaced without the necessity of removing all of the tools or the entire broach or section of the broaching tool from the machine.

These and other objects are attained in accordance with the present invention by providing a broach-like tool with a support in which a plurality of cutting tools are removably and adjustably recessed with the cutting edges of the individual tools arranged in staggered and overlapping relationship, and vertically positioned to cut at succeedingly greater depths.

For a better understanding of the present invention reference may be had to the accompanying drawings in which Figure 1 is a plan view of the planing tool embodying the present invention; Figure 2 is a sectional view taken along the line 2—2 of Figure 1; Figure 3 is a sectional view taken along the line 3—3 of Figure 1; Figure 4 is a sectional view similar to Figure 3 illustrating a modification of the fastening means in Figure 3; Figure 5 is a plan view partly broken away of a modification of the tool of Figure 1, and Figure 6 is a sectional view taken along the line 6—6 of Figure 5.

Referring now to Figure 1, there is illustrated a broaching tool embodying the present invention comprising two similarly constructed tool sections 2 and 20 secured together to form plane surfaces substantially at right angles to each other. The manner in which the two tool sections are secured is better illustrated in Figure 2 and will be described hereinafter. The broaching tool is attached to the reciprocating carriage 4 of a broaching machine, not shown, by lugs 6 held in position by clamping nuts 8. The tool is positioned on the reciprocating carriage by means of angularly faced projecting members recessed in corresponding slots in member 12 bolted to the carriage.

The tool section 2 comprises a support 14 and plurality of individual cutting tools 16 removably recessed in the support perpendicular to the surface plane. The tools are arranged across the support 14 in parallel rows inclined to the transverse and longitudinal axes of the support with the cutting edges in successive rows in overlapping relationship throughout the length of the support. As illustrated in Figure 1 the tool section 2 has ten parallel rows of tools inclined to the transverse axis of the support by about 20 degrees and either four or five individual equally spaced tools respectively in alternate rows. In this connection it will be observed that the staggering of the tools in adjacent rows across the support in the manner shown forms rows of tools along the support inclined to the longitudinal axis by about 20 degrees. Of course it will be obvious that any number of tools may be included in a support depending upon the area of the surface to be broached and in any such tool the arrangement of the tools will be as hereinabove described. Each of the tools 16 is provided with a cutting edge or tip 18 of some satisfactory cutting material, as for example the cutting alloys of tungsten carbide. The cutting edge or tip is recessed in the tool shank and attached in any well-known manner as, for example, by brazing. The individual tools 16 are provided with means for adjusting the depth of the tools and anchoring them in the recesses which will be described hereinafter in connection with Figures 3, 4 and 6 of the drawing.

The tool sections 2 and 20 are secured together in the manner illustrated in Figure 2. Tool section 20 comprises a support member 22 provided with dovetail sections 24 one of which engages a corresponding groove in tool section 2 and the other provides a clamping surface for engagement with lugs 26 secured in position by clamping nuts 28. The arrangement of the cutting tools 30 in support 22 is substantially the same as the arrangement of the cutting tools 16 in support 14. In this connection it will be observed that the cross-sections of the individual tools 30 are aligned with the transverse and longitudinal axes of the support 22 as illustrated in Figure 5. The tools 30 are provided with cutting tips or edges 31 of suitable cutting material as, for example, hard alloys of the tungsten carbide type. The arrangement of tools 30 herein described permits of a tool section of less width with the same number of tools thereby adapting the tool section to cut narrower surfaces such as the inlet and outlet port surface of a valve-in-head engine.

Means for adjusting the position of the cutting tools and locking them in their operating position are illustrated in Figures 3, 4 and 6. In Figure 3 the cutting tools 16 are provided with threaded recesses 32 adapted to receive in threaded engagement adjusting screws 34 which are bottomed on inlaid members 36 arranged transversely of the support 14 and aligned with the tool recesses. A locking nut 36 is provided for fixing the position of the adjusting screw 34. To lock the cutting tools 16 in position, pins 39 having conical ends 40 are recessed in inclined apertures 42 with one end engaging an inclined recess 44 in the side of the cutting tools 16 and the other end engaging conically tipped tap screws 46. It will be observed in this connection that as the tap screws 46 are turned inwardly, pressure is applied through the conical ends of the pins 38 and tap screws 46 to the side of the cutting tools 16 thus locking them in position.

Another form of lock is illustrated in Figure 4 and comprises a wedge member 48 provided with an inclined face 50 cooperating with a similarly inclined face 52 in a recess 54 in the support member 20. The opposite face of the wedge member 48 is formed to frictionally engage the side of the cutting tools 16 to lock them in position. Locking of the cutting tools 16 and 30 in place is obtained by turning the screw-threaded member 56 which draws the wedge 48 more deeply into the recess 54.

Still another form of locking means which is satisfactory is illustrated in Figure 6 wherein a socket head set screw 58 is brought into direct engagement with a recessed portion 60 in the shank of the cutting tool 30 by means of an inclined threaded recess 62.

In preparing the broaching tool for a cutting operation the adjusting screws are set to give the cutting tool its proper depth in the support recesses and the locking nuts are then adjusted to lock the adjusting screws in position. With the individual cutting tools then inserted in the recesses the locking means are adjusted to lock the shanks of the individual tools in place. In this connection it will be readily understood that with a broaching tool such as described hereinabove, the individual cutting tools may be adjusted to different depths across the support to obtain generally curved surfaces as well as plane surfaces. Further, the cutting edge of the tools may be ground so that the cut of overlapping adjacent tool edges form a continuous smooth curved surface across the shape being machined.

A tool such as has been hereinabove described is particularly useful on automatic machines where shutdowns are undesirable. With such an arrangement, individual cutting tools can be removed and replaced quickly without the necessity of removing the entire cutting head. A cutting head of the type of the present invention was found to be serviceable throughout the cutting of surfaces on 65,000 cylinder heads before resharpening whereas a cutting head provided with parallel elongated cutting blades of high speed steel required sharpening after surfacing 600 cylinder heads.

What I claim as new and desire to secure by Letters Patent of the United States is:

In a device for forming plane or generally curved surfaces on metal shapes, a support member adapted for reciprocating movement along a line extending substantially longitudinally thereof, said support member having a plurality of inwardly extending recesses normal to the surface of said support member and being disposed in substantially parallel rows which are oblique to the line of movement of said support member, a series of spaced cutting tools slidably disposed within each of said recesses and having one end thereof projecting beyond the surface of said support member, a cutting edge upon said end of said tool and formed to make a surface cut on a work piece when said support member moves in one direction with respect thereto, said tools in said recesses being so staggered with respect to the tools in adjacent recesses that the cuts made by said cutting edges in said work piece will overlap, adjusting members threadably secured to the opposite ends of each of said cutting tools and engaging the bottoms of said recesses, said members being independently adjustable to vary the amount that each of said cutting edges project beyond said support member whereby the amount of said surface cuts in said work piece may be varied, a threaded locking member mounted on each of said adjusting members and axially displaceable thereon for engaging said opposite ends of said tools to lock said adjusting members in a predetermined adjusted position on said cutting tools, and additional locking means for locking said tools in said support and positioned obliquely with respect to said tools and biasing the base of said adjusting members in abutment against the bottom of said recess simultaneously with biasing the cutting tools against the side of the recess opposite the direction in which the cut is taken thereby.

CLARENCE A. HOOPER.

References Cited in the file of this patent
UNITED STATES PATENTS

| Number | Name | Date |
|---|---|---|
| 161,835 | Squire | Apr. 6, 1875 |
| 1,714,036 | Miller | May 21, 1929 |
| 2,150,455 | Nilsson | Mar. 14, 1939 |
| 2,173,074 | Romaine | Sept. 12, 1939 |
| 2,357,918 | Trippler | Sept. 12, 1944 |
| 2,382,911 | Pringle | Aug. 14, 1945 |
| 2,390,722 | Markstrum | Dec. 11, 1945 |
| 2,392,823 | La Pointe | Jan. 15, 1946 |
| 2,407,921 | Deliso | Sept. 17, 1946 |
| 2,439,822 | Phaneuf | Apr. 20, 1948 |
| 2,584,505 | Severson | Feb. 5, 1952 |